US012311321B2

(12) United States Patent
Azman et al.

(10) Patent No.: US 12,311,321 B2
(45) Date of Patent: May 27, 2025

(54) ANTI-FOULING AND SEMI-PERMEABLE MEMBRANE

(71) Applicants: Aquaporin A/S, Kongens Lyngby (DK); Aquaporin Asia Pte Ltd, Singapore (SG)

(72) Inventors: Nur Amalyna Binte Azman, Singapore (SG); Yang Zhao, Singapore (SG); Ye Wee Siew, Singapore (SG); Dongyu Liu, Brønshøj (DK); Brett Holmberg, Rungsted Kyst (DK); Guofei Sun, Singapore (SG); Weng Hong Ho, Singapore (SG); Xuan Tung Nguyen, Singapore (SG)

(73) Assignees: Aquaporin A/S, Kongens Lyngby (DK); Aquaporin Asia Pte Ltd, Singapore (SG)

( * ) Notice: Subject to any disclaimer, the term of this patent is extended or adjusted under 35 U.S.C. 154(b) by 435 days.

(21) Appl. No.: 17/784,335

(22) PCT Filed: Dec. 14, 2020

(86) PCT No.: PCT/EP2020/085949

§ 371 (c)(1),
(2) Date: Jun. 10, 2022

(87) PCT Pub. No.: WO2021/116488

PCT Pub. Date: Jun. 17, 2021

(65) Prior Publication Data

US 2023/0064768 A1 Mar. 2, 2023

(30) Foreign Application Priority Data

Dec. 12, 2019 (SG) ............................ 10201912023T
Jan. 16, 2020 (DK) ............................ PA202070032

(51) Int. Cl.

| | |
|---|---|
| ***B01D 69/12*** | (2006.01) |
| ***B01D 65/08*** | (2006.01) |
| ***B01D 67/00*** | (2006.01) |
| ***B01D 69/02*** | (2006.01) |
| ***B01D 69/14*** | (2006.01) |
| ***B01D 71/38*** | (2006.01) |
| ***B01D 71/56*** | (2006.01) |
| ***B01D 71/74*** | (2006.01) |

(52) U.S. Cl.

CPC ......... *B01D 69/1251* (2022.08); *B01D 65/08* (2013.01); *B01D 67/0006* (2013.01); *B01D 67/0088* (2013.01); *B01D 69/02* (2013.01); *B01D 69/1216* (2022.08); *B01D 69/141* (2013.01); *B01D 69/144* (2013.01); *B01D 71/381* (2022.08); *B01D 71/383* (2022.08); *B01D 71/56* (2013.01); *B01D 71/74* (2013.01); *B01D 2321/281* (2022.08); *B01D 2323/21826* (2022.08); *B01D 2323/21827* (2022.08); *B01D 2323/21839* (2022.08); *B01D 2323/30* (2013.01); *B01D 2323/40* (2013.01); *B01D 2325/28* (2013.01); *Y02A 20/131* (2018.01)

(58) Field of Classification Search

CPC ........................... B01D 69/1251; B01D 65/08; B01D 67/0006; B01D 67/0088; B01D 69/02; B01D 69/1216; B01D 69/141; B01D 69/144; B01D 71/381; B01D 71/383; B01D 71/56; B01D 71/74; B01D 2321/281; B01D 2323/21826; B01D 2323/21827; B01D 2323/21839; B01D 2323/30; B01D 2323/40; B01D 2325/28; Y02A 20/131

USPC .............................. 210/500.27, 500.42, 652

See application file for complete search history.

(56) References Cited

U.S. PATENT DOCUMENTS

| | | | | |
|---|---|---|---|---|
| 4,277,344 A * | 7/1981 | Cadotte | C08G 69/28 428/479.3 |
| 6,413,425 B1 | 7/2002 | Hackisuka | |
| 2010/0320143 A1 | 12/2010 | Konishi et al. | |

FOREIGN PATENT DOCUMENTS

| | | | |
|---|---|---|---|
| CN | 101130444 | 2/2008 | |
| CN | 106178996 A * | 12/2016 | B01D 61/025 |
| CN | 105561801 | 4/2018 | |
| DE | 19925475 A1 * | 12/2000 | B01D 61/362 |
| JP | H0256225 | 2/1990 | |
| JP | H11226367 | 8/1999 | |
| JP | 2000061277 | 2/2000 | |
| JP | 2002161246 | 6/2002 | |
| JP | 2003200026 | 7/2003 | |
| JP | 2009045595 | 3/2009 | |

(Continued)

OTHER PUBLICATIONS

Machine-generated English translation of CN 105561801, generated on Oct. 16, 2024.*

(Continued)

*Primary Examiner* — Fred Prince

(74) *Attorney, Agent, or Firm* — Crockett & Crockett, PC; K. David Crockett, Esq.; Niky Economy Syrengelas, Esq.

(57) ABSTRACT

The present invention relates to an anti-fouling, semi-permeable membrane comprising a porous support layer, a thin film composite (TFC) layer formed on a surface of the support layer, and a cross-linked polyvinyl alcohol (PVA) layer formed on top of the TFC layer, wherein the cross-linked PVA layer is the reaction product of PVA and a cross-linking agent, said cross-linking agent being a polybasic acid comprising three or more acid groups or precursors thereof. The obtained membrane shows a high water flux and a low roughness suitable for an effective membrane notable for feed solution having a tendency of fouling the membrane.

14 Claims, No Drawings

(56) References Cited

FOREIGN PATENT DOCUMENTS

| | | |
|---|---|---|
| JP | 2014524828 | 9/2014 |
| JP | 2015139740 | 8/2015 |
| JP | 2016514039 | 5/2016 |
| WO | WO2015013358 | 1/2015 |
| WO | WO2018141985 | 8/2018 |

OTHER PUBLICATIONS

Machine-generated English translation of DE 19925475, generated on Oct. 16, 2024.*

Machine-generated English translation of CN 106178996, generated on Oct. 16, 2024.*

Second Office Action dated Apr. 19, 2024 from Chinese Patent Application No. 202080096426.5.

Notification of First Examination Opinion dated Oct. 31, 2023 from Chinese Patent Application No. 202080096426.5.

Written Opinion dated Nov. 16, 2023 from Singapore Patent Application No. 11202250281F.

International Search Report and Written Opinion dated Apr. 28, 2021 from International Application No. PCT/EP2020/085949.

Lang, et al. A Study on the Preparation of Polyvinyl Alcohol Thin-Film Composite Membranes and Reverse Osmosis Testing, 104 Desalination, Elsevier 185 (1996).

Notice of Reasons for Refusal and Search Report dated Jul. 17, 2024 from Japanese Patent Application No. 2022-535970.

* cited by examiner

ANTI-FOULING AND SEMI-PERMEABLE MEMBRANE

TECHNICAL FIELD

The disclosure relates to, an anti-fouling and semi-permeable membrane and more particularly to an anti-fouling, semi-permeable membrane comprising a porous support layer, a thin film composite (TFC) layer formed on a surface of the support layer, and a cross-linked polyvinyl alcohol (PVA) layer formed on top of the TFC layer. Furthermore, the invention relates to modules comprising the anti-fouling and semi-permeable membranes as well as uses of these modules for treating liquid foodstuff-derived streams like whey, coffee extracts, fruit juice, coconut milk, etc.

BACKGROUND

Reverse osmosis (RO) is generally used to treat water containing dissolved salts. An example of application of the reverse osmosis technology is using sea water or brackish water for producing desalinated potable water. In recent years forward osmosis (FO) has become increasingly popular. In a forward osmosis plant a feed is typically de-watered to concentrate the feed stream, whereas a draw solution is diluted by the water migrating across the membrane.

For RO membranes as well as FO membranes, deposits on the surface of the membranes becomes noticeable after some time of use. This phenomenon is often referred to fouling and generally result in a decrease in the performance of the membrane.

Polyvinyl alcohol (PVA) has been used in US2005077243 (A1) as a coating layer for preventing or delaying the deposition of fouling on a reverse osmosis membrane. The PVA coating is prepared from a polymer that is water swellable but water insoluble. Because the polymer is water insoluble, crosslinking is not required after the coating has been deposited. The applied to PVA layer smoothens the surface and reduces the tendency of particulate matter to deposit.

U.S. Pat. No. 6,413,425 BA discloses a RO membrane comprises a support membrane and a polyamide thin film composite (TFC) layer. A surface of the separation layer is coated with a PVA (average polymerization degree n=2,600) layer to reduce the specific surface area, thereby decreasing the fouling tendency. The PVA is water insoluble at 25° C. but water soluble at 80° C. and has a degree of saponification in a range of 99% to 100%. The reverse osmosis composite membrane has a high fouling tolerance and permits practical desalination at a relatively low pressure.

US2010224555 (A1) discloses a nanocomposite membrane that includes a PVA film having a polymer matrix with nanoparticles disposed within the polymer matrix. The membrane can be brought into contact (e.g., from the PVA side) with a solution containing a cross-linking agent (e.g., dialdehydes and dibasic acids) and catalyst (e.g., 2.4 wt % acetic acid) for about 1 second. The membrane can then be heated in an oven at a predetermined temperature for a predetermined period. Various cross-linking agents (glutaraldehyde, PVA-glutaraldehyde mixture, paraformaldehyde, formaldehyde, glyoxal) and additives in the PVA solution (formaldehyde, ethyl alcohol, tetrahydrofuran, manganese chloride, and cyclohexane) can be used to prepare PVA films cast over existing membranes in combination with heat treatment of prepared PVA films to modify film properties. US2010320143 (A1) and US2011027599 (A1) discloses a similar technology enclosing nanoparticles in a PVA layer.

US2010178489 (A1) discloses a composite semipermeable membrane having a skin layer which includes a polyamide resin and a porous support that supports the skin layer. The skin layer may be coated with an anti-bacterial layer containing a silver-based antibacterial agent and PVA. To attach the PVA layer to the polyamide-based resin of the skin layer, the polyvinyl alcohol may be cross-linked. The cross-linking of polyvinyl alcohol includes forming an antibacterial layer on a skin layer and then immersing the antibacterial layer in a solution containing glutaraldehyde acidified with hydrochloric acid.

The PVA layer suggested in the prior art may reduce the fouling tendency of the membrane due to increased smoothness provide by the PVA layer. However, the additional layer on the membrane also has a tendency to reduce the water flux. The present invention aims at retaining a high surface smoothness to prevent or reduce deposition of particulate matter in the feed, while at the same time obtaining a higher water flux.

SUMMARY

The present invention relates to anti-fouling, semi-permeable membrane comprising a porous support layer, a thin film composite (TFC) layer formed on a surface of the support layer, and a cross-linked polyvinyl alcohol (PVA) layer formed on top of the TFC layer, wherein the cross-linked PVA layer is the reaction product of PVA and a cross-linking agent, said cross-linking agent being a polybasic acid comprising three or more acid groups or precursors thereof.

The prior art cross-linking agents have focused on the attachment of the PVA layer to the TFC layer of the membrane to ensure a long life-time of the membrane. The present invention suggests using a polybasic acid comprising three or more acid groups or precursor thereof as the cross-linking agent to open up the structure of the PVA-layer, while at the same time maintaining or even increasing the surface smoothness. The open structure of the PVA-layer allows for an increased permeation of water and will therefore be less rate limiting on the water flux. The increased smoothness reduces the fouling tendency of the membrane.

The porous support layer used in the anti-fouling and semipermeable membrane of the invention is a porous substrate, e.g. a nano-porous or micro-porous layer that do not substantially inhibit the permeation of water. In some cases, the porous support layer may further be reinforced by being cast on a woven or non-woven sheet, e.g. formed from polyester fibers. The porous support layer is generally prepared of polyethersulfone (PES), polysulfone (PS), polyphenylene sulfone, polyether imide, polyvinylpyrrolidone and polyacrylonitrile, including blends and mixtures thereof. In an embodiment of the invention, the porous support membrane is prepared from a dope containing the polymer dissolved in a solvent. After the dope has been casted in a layer of a desired thickness, a phase inversion is performed by quenching in a non-solvent, like water.

The porous support layer is modified by forming a thin film composite (TFC) layer, e.g. through interfacial polymerization, on face thereof. The TFC layer may be prepared using an amine reactant, preferably an aromatic amine, such as a diamine or triamine, e.g. 1,3-diaminobenzene (m-Phenylenediamine—MPD) in an aqueous solution, and an acyl halide reactant, such as a di- or triacid chloride, preferably an aromatic acyl halide, e.g. benzene-1,3,5-tricarbonyl chloride (TMC) dissolved in an organic solvent where said reactants are combined in an interfacial polymerization reaction.

In a certain embodiment of the present invention, the TFC layer comprises nano-porous water channels, such as aquaporin water channels. The nano-porous water channels ideally have a configuration allowing only water to permeate. However, in reality also a minor amount of refluxed solutes penetrates the TFC layer from the feed solution to the draw solution or permeate. The nano-porous water channels reduce or eliminate reabsorption of all or most other solutes from the feed solution. It is preferred that the TFC layer comprises aquaporin water channels, which, due to their highly selective nature, only allow water molecules to pass. The aquaporin water channels may be stabilized before being incorporated in the TFC layer.

Vesicles are the natural environment for the aquaporin water channels and the vesicles may be formed by a number of different vesicle forming materials including the naturally occurring phospholipids. Suitably, the stabilized aquaporins may be in the form of vesicles being formed by self-assembly of amphiphilic matrix forming compounds in the presence of an aquaporin protein preparation as disclosed in WO2018/141985 or WO18087289. Alternatively, the aquaporin water channels may be stabilized by PEI (polyethyleneimine) as disclosed in WO2017137361 A1. Membranes prepared using these stabilized aquaporin water channels have proven to be robust, to have high water transport capacity and low reverse flux of ions. In a certain embodiment of the invention the aquaporin water channels are present in vesicles.

Suitably, the vesicles are polymersomes prepared by one or more polymers. Polymersomes may withstand relatively high pressures making them suitable for reverse osmosis processes. The polymers of the polymersomes may suitably be selected as PMOXA-PDMS diblock copolymers (poly (2-methyloxazoline)-block-poly(dimethyl siloxane) diblock copolymer), to form self-assembled vesicles with transmembrane proteins, such as aquaporin water channels. The vesicles may then be used in the production of a TFC layer in which the transmembrane proteins are incorporated or immobilised and active for allowing water molecules to pass through the membrane. For example, for the production of a membrane comprising aquaporin water channels, the vesicles may be added to an aqueous liquid composition comprising an aromatic amine, such as a diamine or triamine, e.g., 1,3-diaminobenzene (MPD) applied to the surface of the porous support membrane, which, when brought into contact with a solution of an acid halide in an organic solvent, will participate in an interfacial polymerization reaction to form the thin film composite layer on said support, thus forming a separation membrane wherein said vesicles have become immobilized or incorporated.

In a certain aspect, the $PMOXA_{a-b}$-$PDMS_{c-d}$ of the vesicle is selected from the group consisting of $PMOXA_{10-40}$-$PDMS_{25-70}$ and mixtures thereof. To increase the robustness of the vesicle it may be preferred to use a mixture comprises at least a first amphiphilic diblock copolymer of the general formula $PMOXA_{10-28}$-$PDMS_{25-70}$ and a second amphiphilic diblock copolymer of the general formula $PMOXA_{28-40}$-$PDMS_{25-70}$. The weight proportion between the first and the second amphiphilic diblock copolymer is usually in the range of 0.1:1 to 1:0.1. The concentration of amphiphilic diblock copolymer in the liquid composition is generally in the range of 0.1 to 50 mg/ml, such as 0.5 to 20 mg/ml, and preferably 1 to 10 mg/ml.

The reactive end group functionalised $PDMS_{e-f}$ (reactive end group functionalized poly(dimethyl siloxane)) of the vesicle is usually present in a concentration of from about 0.05% to about 1% v/v of a liquid composition comprising the vesicle. The reactive end group functionalised $PDMS_{e-f}$ may be functionalized with one, two or more of amine, carboxylic acid, and/or hydroxy groups. Suitably, the integer e is selected in the range of 20 to 40, such as 30 and the integer f is selected from the range of 40 to 80, such as 50. In a certain aspect of the invention the reactive end group functionalised $PDMS_{e-f}$ is bis(amino alkyl), bis(hydroxyalkyl), or bis(carboxylic acid alkyl) terminated $PDMS_e$-f, such as poly(dimethyl siloxane), bis(3-aminopropyl) or poly(dimethyl siloxane), bis(3-hyroxypropyl). Furthermore, the reactive end group functionalised $PDMS_{e-f}$ may be selected from the group consisting of $H_2N$-$PDMS_{30-50}$, HOOC-$PDMS_{30-50}$, and HO-$PDMS_{30-50}$ and mixtures thereof. Examples of said end-functionalised $PDMS_{e-f}$, where e-f represents the range of from 30 to 50, are bis(aminopropyl) terminated poly(dimethyl siloxane) having the formula shown here below where (CAS Number 106214-84-0, Aldrich product No. 481246, average Mn ~5,600 or CAS Number 106214-84-0, product No. 481696 Aldrich, average Mn ~27,000:

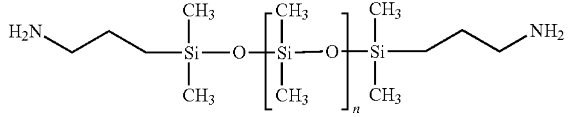

and bis(hydroxyalkyl) terminated poly(dimethyl siloxane) having the formula shown here below where n is approximately 30 to 50 and m and p are both integers between 2 and 5, such as 3 or 4, (CAS Number 156327-07-0, Aldrich product No. 481246, average Mn ~5,600):

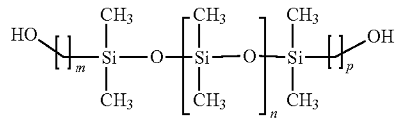

The vesicle may further contain about 1% v/v to about 12% v/v of triblock copolymer of the $PMOXA_{a-b}$-$PDMS_{c-d}$-$PMOXA_{a-b}$ type to increase its integrity. Typically, said vesicle comprises from about 8% v/v to about 12% v/v of triblock copolymer of the $PMOXA_{a-b}$-$PDMS_{c-d}$-$PMOXA_{a-b}$ type. The triblock copolymer of the $PMOXA_{a-b}$-$PDMS_{c-d}$-$PMOXA_{a-b}$ type is typically selected from $PMOXA_{10-20}$-$PDMS_{25-70}$-$PMOXA_{10-20}$.

The vesicle in the liquid formulation of the invention may further comprise a flux improving agent to increase either the water flux or decrease the reverse salt flux or both. The flux improving agent may be selected among a large group of compounds but is generally preferred as alkylene glycol monoalkyl ether alkylat, beta cyclodextrin, or polyethylene glycol (15)-hydroxystearate. The flux increasing agent is usually present in an amount of 0.1% to 1% by weight of the liquid composition.

Without wishing to be bound by any particular theory, it is believed that the vesicles containing free available reactive groups on the surface will be not only physically incorporated or immobilised in (adsorbed), but, in addition, chemically bound in the TFC layer, because the reactive free end groups, such as amino groups, hydroxyl groups and carboxyl groups, will participate in the interfacial polymerization reaction with the acyl chloride, such as a trimesoyl chloride (TMC). In this way, it is believed that vesicles will be covalently bound in the TFC layer, leading to relatively higher vesicle loading and thus higher water flux through the membranes. In addition, it is believed that the covalent coupling of vesicles in the TFC layer results in higher stability and/or longevity of the aquaporin water channels and the vesicles containing aquaporin water channels when incorporated in the selective membrane layer.

Polyvinyl alcohol (PVA) is generally prepared from Poly (vinyl acetate). The degree of polymerisation of poly(vinyl acetate) is typically 100 to 5000. The ester groups of poly(vinyl acetate) are susceptible to base hydrolysis, which converts the poly(vinyl acetate) into polyvinyl alcohol and acetic acid. The process is herein referred to as hydrolysis but may also be referred to as saponification in the prior art.

In a certain embodiment of the invention the PVA is derived from hydrolysis of polyvinyl acetate, the degree of hydrolysis of the polyvinyl acetate being from 90% to 99.9%. Preferably, the degree of hydrolysis is between 95% to 99.5%, such as 98.0 to 99.0%. Thus, the PVA polymers are actually copolymers of vinyl alcohol with small proportions of vinyl acetate comonomer.

The degree of polymerisation is generally measured in viscosity as the viscosity increases with increasing degree of polymerisation. In a certain aspect the viscosity of the PVA measured as a 4% aqueous solution at 20° C. is between 20 and 80 mPa·s. In a preferred embodiment, the degree of polymerisation is suitably between 50 and 70 mPa·s for obtaining a high water flux. The polyvinyl alcohol may be obtained from various vendors but is currently obtained from Kuraray Poval. Suitable grades include the fully hydrolysed grades, i.e. hydrolyses of 98 to 99 mol-%, having a viscosity of about 30 or about 60 mPa·s.

The PVA polymer may be cross-linked with chemical agents, such as aldehydes and acids, and ultraviolet irradiation. According to the present invention a polybasic acid is used, i.e. a compound having three or more acid groups or precursors for such acid groups. Precursor groups for acid groups include e.g. aldehydes (—CHO), acid halides (—COOX, in which X is Cl, Br, or I), and alkali metal salts of carboxylic acids (—COOM, in which M is Li, Na, or K). Generally, an aliphatic cross-linking agent is preferred even though an aromatic cross-linker like trimesic acid may also be used in some instances. Suitably, the polybasic acid is selected from the group consisting of citric acid, 1,2,3,4-butanetetracarboxylic acid, 2,3,5-hexanetricarboxylic acid, and 1,2,3-butanetricarbaoxylic acid. In a preferred aspect, the polybasic acid is citric acid. Citric acid has a high biological tolerance and can therefore be used in the preparation of foodstuff without reservations. Thus, membranes produced using citric acid as the cross-linker are generally regarded as having a wider application area, that also include the treatment of foodstuff.

The amount of polybasic acid is generally adjusted to the amount of hydroxy groups available for reaction on the PVA polymers. Thus, in a certain embodiment the amount of polybasic acid is adjusted so that at least 40% of the hydroxy groups on the PVA polymers can react. In a preferred aspect of the invention the amount of polybasic acid is at least 60, such as at least 80% of the hydroxy groups on the PVA polymers. In as preferred embodiment, the amount of polybasic acid is adjusted so that about 100% of the available hydroxy groups can react with the acid groups of the polybasic acid.

The porous support membrane may be a hollow fiber membrane or a flat sheet membrane. Currently, a flat sheet membrane is suitable and may be used for the production of various modules like plate-and-frame modules or spiral-wound modules.

The invention also relates to a method of preparing an anti-fouling, semi-permeable membrane comprising the steps of:

- providing a semi-permeable membrane comprising a porous support layer having a thin film composite (TFC) layer formed on a surface thereof,
- applying a layer of an aqueous PVA mixture of polyvinyl alcohol and a cross-linking agent to the TFC layer surface of the membrane, and
- allowing the mixture to react, wherein the cross-linking agent is a polybasic acid having three or more acid groups or precursors thereof.

While the aqueous mixture may be applied to the semi-permeable membrane without pre-treatment, it is suitable that the semi-permeable membrane comprising a support layer having a thin film composite layer formed on a surface thereof is treated with an aqueous glycerol solution prior to the application of the aqueous PVA mixture. The aqueous glycerol solution may be applied to the porous side, the TFC layer side or both before application of the aqueous PVA mixture, but in general only a glycerol solution is applied to the support layer surface of the TFC membrane prior to the application of aqueous PVA mixture. The application of aqueous glycerol to the porous side of the membrane only allows for a production more tolerant for variations in e.g. glycerol concentration and less variation in the water flux.

Suitably the concentration of glycerol in the glycerol solution may be between 5% and 50%, such as 10 to 40. Generally, it is preferred that the concentration of the glycerol in the glycerol solution is 13% by weight to 80% by weight.

The aqueous PVA mixture may be applied to the TFC membrane using a number of methods, including pouring and spraying. In a preferred method, to obtain a higher water flux, the aqueous PVA mixture is applied to the TFC membrane by spraying.

Generally, the polybasic acid is selected among the group consisting of citric acid, 1,2,3,4-butanetetracarboxylic acid, 2,3,5-hexanetricarboxylic acid, and 1,2,3-butanetricarbaoxylic acid. In a certain aspect the polybasic acid is citric acid. The polybasic cross-linking agent is believe to open up the structure of the PVA layer thereby increasing the water flux.

In a certain embodiment, the concentration by weight of polybasic acid is equal to or higher than the concentration by weight of the PVA in the aqueous PVA mixture. Preferably, the concentration by weight of citric acid is at least twice the concentration of the PVA in the aqueous mixture.

Addition of a polybasic acid to the aqueous PVA mixture surprisingly results in that the average roughness decreases when the membrane is coated with the PVA layer. Furthermore, the contact angle as well as the zeta potential are significantly reduced when polybasic acid is added to the PVA solution. A low surface roughness and a low zeta potential are generally regarded to improve the anti-fouling properties of the membrane. The fact that the surface charge tends towards neutrality when citric acid is added to the PVA-solution is also regarded to improve the anti-fouling characteristics.

EXAMPLES

Example 1.1: Production of the Support Membrane

A dope was prepared of 17% polysulfone (Solvay P3500 MB7 LCD) dissolved in 83% DMF (N,N-Dimethylformamide) obtained from TACT Chemie. The dope was mixed at a mixing speed of 90 rpm in a closed container at 45° C. for 8 hours for obtaining a uniform viscosity.

The dope was casted on a non-woven polyester sheet (model PMB-SKC) obtained from Mitsubishi in a knife over roll casting mode using a casting gap of 230 μm. After an exposure time 1.9 s a phase inversion was performed by quenching in water at 13° C. for 16 s. Subsequently the support membrane was washed in water at 60° C. for 120 s. A thickness of about 130 μm was obtained.

Example 1.2: Production of Aquaporin Water Channel

Expression of Histidine Tagged Aquaporin from *Oryza sativa Japonica* (Japanese Rice) in *Escherichia coli* and its Purification Using Immobilized Metal Affinity Chromatography (IMAC)

The gene encoding aquaporin from *Oryza sativa Japonica* (UNIPROT: A3C132) was codon optimized using Geneart's (Subsidiary of Thermo Fischer Scientific) service for improving expression in *E. coli*. The resulting gene was synthesized with the addition of ten histidine encoding codons C-terminally, along with flanking NdeI/XhoI restriction sites N-terminally and C-terminally, respectively (Gene ID: aquaporin_*Oryza_sativa_Japonica*). The synthetic gene fragment was digested with NdeI/XhoI restriction enzymes and ligated to NdeI/XhoI—digested and purified vector pUP1909 fragment. The resulting ligation mixture was transformed into *Escherichia coli* DH10B and kanamycin resistant transformants were selected on LB agar plates with kanamycin. Transformants were confirmed by sequencing of the genetic construct. Isolated vector DNA was subsequently transferred to the production host, *Escherichia coli* BL21.

In order to heterologously express aquaporin in *E. coli*, the production host was grown in minimal medium consisting of 30 g/L Glycerol, 6 g/L (NH4)2HPO4, 3 g/L KH2PO4, 5 g/L NaCl, 0.25 g/L MgSO4·7H2O, 0.4 g/L Fe(III)citrate and 1 mL/L sterile filtered trace metal solution. The trace metal solution consisted of 1 g/L EDTA, 0.8 g/L CoC12·6H2O, 1.5 MnC12·4H2O, 0.4 g/L CuC12·2H2O, 0.4 g/L H3BO3, 0.8 g/L Na2Mo04·2H2O, 1.3 g/L Zn(CH3COO)2·2H2O. After inoculation and overnight growth, additional 0.25 g/L MgSO4.7H2O was added.

*E. coli* was cultivated in 3 L Applikon Bioreactors with ez-Control in a batch fermentation process. Protein production was induced by addition of IPTG to a final concentration of 0.5 mM at an optical density (OD 600 nm) of approximately 30. The culture was induced for approximately 24 hours and the bacterial cells were harvested with centrifugation at 5300 g for 20 min.

The pellets comprising the *E. coli* cells were resuspended in buffer (aqueous solution of the protease inhibitor PMSF and EDTA) and homogenized at 1000 bar in a Stansted nm-GEN 7575 homogenizer. The temperature was maintained around 10-15° C. The mixture was centrifuged at a maximum speed of 5300 g for 30 minutes. The pellet contains the membrane protein and the supernatant is discarded.

The pellet was resuspended in a 0.9% sodium chloride solution to obtain a total protein concentration of approximately 50 mg/ml. Solubilization of the membrane protein was performed by adding 28 L TRIS binding buffer and 4.5 liter 5% n-lauryl dimethylamine N-oxide (LDAO) to 5 L of the resuspended pellet material. At room temperature and gentle stirring the mixture was allowed to incubate for 2 to 24 hours.

After the solubilization process the mixture was centrifuged in 2 L containers at 5300 g for 90 minutes. The supernatant was recovered and the LDAO concentration was adjusted to 0.2% by addition of dilution buffer.

After solubilization and clarification, the protein was captured using IMAC and eluted in Elution buffer containing 1000 mM imidazole and 0.2% w/v LDAO. The elution fractions were analyzed by SDS Page and only revealed a single major band which migrated at 27 kDa which corresponds to the size of aquaporin from Japanese rice. Furthermore, the result was confirmed by comparison to a negative control purification from *E. coli* transformed with an empty vector. The negative control resulted in no purified protein. Western blot analysis with antibodies (TaKaRa Bio) specific for the histidine-tag resulted as expected in a clear signal from the purified protein and no signal from the negative control confirming the origin of the purified protein as the histidine tagged membrane protein.

A stock solution was prepared by adjusting the protein concentration to 5 mg/ml by adding ice cold imidazole-free buffer containing 2% LDAO. Finally, the aquaporin stock solution was sterilized by filtration through 0.45 μM sterilized cup and stored at 4° C. in refrigerator for use within a month or else stored at −80° C. in a freezer.

Example 1.3: Production of Aquaporin Formulation

1. Prepare a 0.5% by weight Kolliphor® HS 15 (polyethylene glycol (15)-hydroxystearate) (KHS) solution by dissolving 5 g KHS in 11 PBS (prepared by dissolving 8 g NaCl, 0.2 g KCl, 1.44 g Na2HPO4 and 0.24 g of KH2PO4 in 800 mL MiliQ purified H2O, adjusting the pH to 7.2 with HCl and completing the volume to 1 L).
2. Prepare a 0.05% by weight LDAO solution in PBS by dissolving 0.05 g LDAO in 100 mL PBS.
3. In the preparation vessel, weigh 0.5 g poly(2-methyloxazoline)-block-poly(dimethylsiloxane) diblock copolymer ($PDMS_{65}PMOXA_{24}$) per L of prepared formulation.
4. In the same preparation vessel weigh poly(2-methyloxazoline)-block-poly(dimethylsiloxane) diblock copolymer ($PDMS_{65}PMOXA_{32}$ to reach a concentration on 0.5 g/L of prepared formulation (1:1 weight ratio $PDMS_{65}PMOXA_{24}$ and $PDMS_{65}PMOXA_{32}$)
5. In the same preparation vessel, add poly(2-methyloxazoline)-block-poly(dimethylsiloxane)-block-poly-(2-methyloxazoline) triblock copolymer $PMOXA_{12}PDMS_{65}PMOXA_{12}$ to reach a concentration of 0.12 g/L of prepared formulation.
6. Add LDAO 0.05% prepared in step 2 in the proportion 100 mL/L of prepared formulation.
7. Add the bis(3-aminopropyl) terminated poly(dimethylsiloxane) having a molecular weight of 2500 Da to reach a final concentration of 0.1%.
8. Add aquaporin stock solution to reach a concentration of 5 mg/L of prepared formulation and a 1/400 protein: polymer ratio.
9. Add 3% by weight KHS solution prepared in step 1 to reach the desired volume of prepared formulation subtracting the volumes of LDAO, bis(3-aminopropyl) terminated poly(dimethylsiloxane) and aquaporin added in step 6 and 8.
10. Stir the mixture from step 9 overnight at 170 rotations per minute (not more than 20 hours) at room temperature to achieve the formulation.

11. Next morning take the prepared formulation obtained in the sequence of steps 1 to 10 and filter it through 200 nm pore size filters to sterilize it, put it in a closed sealed bottle and keep it at room temperature for not more than 12 months.

Example 1.4: Production of TFC Layer on the Support Membrane a. Prepare an aqueous solution by mixing in DI water
   i. 3.0% MPD
   ii. 0.75% ε-caprolactam (CAP)
   iii. 3% aquaporin formulation
b. Prepare an organic solution with 0.13% TMC in Isopar E.
c. TFC formation
   i. Support membrane was dipped in the aqueous solution for 50 seconds,
   ii. Membrane was dried with air gun at 1 bar,
   iii. Organic solution was added for 20-22 seconds
   iv. Membrane was dried with air gun at about 0.1 bar
d. The membrane with TFC layer was placed in 70° C. 10% citric acid for 4 min and then in 60° C. DI water for 2 min.
e. The membrane was dipped in 2000 ppm sodium hypochlorite solution for 2 min, then dipped in room temperature DI water for 1 min, and finally dipping in 1% sodium bisulfite (SBS)

Example 2: Glycerol Treatment Prior to PVA Layer

Aqueous 10% and 20% glycerol solutions were prepared. In a first run the membranes obtained in example 1.4 were dipped in the glycerol solutions for 1 min, treated with an air knife to remove excess glycerol solution, and then treated by pouring with an aqueous 0.35% PVA solution (Kuraray Poval, type 60-98) for 30 s, treatment with air-knife at 1 bar to remove excess PVA solution, and dried in oven at 60° C. for 4 min. The results are shown in table 1 below:

TABLE 1

| Glycerol dip | A [LMH/bar] | Rejection [%] |
|---|---|---|
| 10%, 1 min | 5.0 ± 0.5 | 99.0 ± 0.0 |
| 20%, 1 min | 5.3 ± 0.4 | 98.8 ± 0.2 |

By changing the application method from dipping the entire membrane in to the glycerol solution to just applying the glycerol solution to the backside of the membrane obtained in example 1.4, another test run was performed. The results are shown in table 2 below:

TABLE 2

| Backside glycerol | A [LMH/bar] | Rejection [%] |
|---|---|---|
| 10%, 1 min | 4.7 ± 0.5 | 98.9 ± 0.0 |
| 20%, 1 min | 5.1 ± 0.4 | 98.9 ± 0.1 |

The results shown in table 1 and 2 indicate that the flux improves when using 20% glycerol compared to 10% glycerol. A slight drop in the rejection for glycerol dip was observed. However, with back-side glycerol, the change in glycerol concentration does not seem to affect the rejection. The deviations in flux are also lesser as compared to glycerol dip.

The test runs were repeated and including a longer reaction time of 3 min for the glycerol solution. The results are shown in table 3.

TABLE 3

| Backside glycerol | A [LMH/bar] | Rejection [%] |
|---|---|---|
| 10%, 1 min | 4.7 ± 0.0 | 98.9 ± 0.0 |
| 10%, 3 min | 4.9 ± 0.1 | 98.9 ± 0.1 |
| 20%, 1 min | 5.1 ± 0.3 | 98.9 ± 0.1 |
| 20%, 3 min | 5.6 ± 0.1 | 98.9 ± 0.0 |

The results in Table 3 show that treatment with 20% glycerol solution and a reaction time of 3 min for the PVA solution provides the highest flux and the same rejection.

Example 3: Reaction Time and Type of PVA Solution

A membrane treated with 20% glycerol on the back side for 3 minutes were poured with a 0.35% PVA 60-98 solution for 10 s or 30 s, treated with air-knife at 1 bar, and then dried in oven at 60° C. for 4 minutes. The results are shown in table 4:

TABLE 4

| Backside glycerol | A [LMH/bar] | Rejection [%] |
|---|---|---|
| Control (no PVA) | 5.7 ± 0.0 | 98.9 ± 0.1 |
| PVA coating, 10 s | 4.5 ± 0.1 | 99.3 ± 0.2 |
| PVA coating, 30 s | 4.5 ± 0.1 | 99.2 ± 0.3 |

The results show that the flux and the rejection remain essentially unchanged. Therefore, for further investigation, 10 s PVA reaction time was used.

Various types of PVA obtainable from Kuraray Poval® was screened using the experience from the test runs above, i.e. 20% glycerol back-side treatment for 3 min, 0.35% PVA solution applied the pour method and allowed to react for 10 s, treatment with air-knife at 1 bar to remove excess PVA solution and then oven-dried at 60° C. for 4 min. The results for various PVA types and qualities are shown below in table 5.

TABLE 5

| Types of PVA [N = 5] | A [LMH/bar] | Rejection [%] |
|---|---|---|
| Control (no PVA) | 5.4 ± 0.3 | 98.9 ± 0.3 |
| PVA 4-98 | 4.8 ± 0.5 | 98.5 ± 0.6 |
| PVA 18-88 | 4.7 ± 0.5 | 98.5 ± 0.5 |
| PVA 30-75 | 3.9 ± 0.5 | 99.3 ± 0.6 |
| PVA 28-99 | 4.0 ± 0.1 | 98.9 ± 0.4 |
| PVA 30-99 | 4.3 ± 0.5 | 99.3 ± 0.2 |
| PVA 30-98 | 4.4 ± 0.2 | 99.2 ± 0.1 |
| PVA 60-98 | 4.4 ± 0.1 | 99.3 ± 0.2 |

The first number in the nomenclature denotes the viscosity of the 4% aqueous solution at 20° C. as a relative measure for the molar mass of the PVA. The second number denotes the degree of hydrolysis of the polyvinyl acetate from which the PVA is derived.

The results shown in table 5 show that PVA 30-98 and PVA 60-98 are good candidates as they show high flux and rejection, and at the same time low deviation. These candidates were compared to the commercially available Hypershell DOW membrane (benchmark). The results are shown in table 6 below.

TABLE 6

| N = 4 | A [LMH/bar] | Rejection [%] |
|---|---|---|
| Control (no PVA) | 5.8 ± 0.1 | 99.0 ± 0.1 |
| PVA 30-98 | 4.2 ± 0.1 | 99.2 ± 0.1 |
| PVA 60-98 | 4.4 ± 0.2 | 99.4 ± 0.0 |
| DOW Hypershell | 3.5 ± 0.1 | 99.5 ± 0.1 |

Based on the results shown in table 6, PVA 60-98 is selected for further development due to higher flux and rejection compared to PVA 30-98. The rejection is essential at the same level as the benchmark, however, the flux is about 25% higher.

Example 4: PVA Application Method

It was observed that the PVA layer of the coated membranes was rather thick by a PVA dye test. The relatively thick layer could be the reason for a relatively high drop in flux compared to the control membrane. Therefore, a spraying method for applying the PVA solution was used and compared with the pouring method. The results for the flux is shown in table 7 below.

TABLE 7

| Spray | PVA 60-98 [LMH/bar] | DOW [LMH/bar] | Control [LMH/bar] |
|---|---|---|---|
| PWP*) | 6.4 (spray)<br>5.3 (pour) | 4.0 | 7.4 |
| BWRO**) | 4.5 (spray)<br>3.8 (pour) | 2.9 | 5.2 |

Test conditions:
*)10 bar, 25 C., RO water
**)15.5 bar, 25 C., 2000 ppm NaCl feed, 1.8 LPM flow rate.

The results of table 7 show that the membrane having the PVA solution applied by spraying improves the PWP flux by about 20% relative to the pouring method and 60% relative to the benchmark from DOW.

Example 5: Citric Acid (CA) Cross-Linker

In an attempt to improve the flux further, citric acid was added to the PVA solution as a cross-linking or pore forming agent.

A PVA solution prepared as indicated above was supplemented with 0.42% by weight citric acid, corresponding to 50% crosslinking degree when reacted with the available OH groups of the PVA. The PVA was applied by the spray method and allowed to react for 10 s before excess PVA solution was removed with air knife. The results are indicated in table 8 below.

TABLE 8

| Citric acid | A [LMH/bar] | Rejection [%] |
|---|---|---|
| PVA | 4.5 | 99.1 |
| PVA + CA (50%) | 4.9 | 99.1 |

Test Conditions: 2000 ppm NaCl Feed, 15.5 Bar, 1.8 LPM Flow Rate

The results show that an improvement of the flux of about 9% can be obtained by adding citric acid to the PVA solution.

The surface roughness, Ra (nm), the contact angle and the zeta potential (mV) were investigated for the PVA membrane as well as the PVA+CA(50%) and compared to control membrane not treated with PVA. The results are shown in table 9 below.

TABLE 9

| | Average roughness (nm) | Contact angle | Zeta potential (mV) |
|---|---|---|---|
| PVA | 35.6 | 70.4 | −9.00 |
| PVA + CA (50%) | 22.4 | 61.2 | −6.33 |
| Control | 53.9 | 55.3 | −22.05 |

The results in table 9 show that the average roughness decreases when the membrane is coated with a PVA layer. A further decrease in roughness is obtained by citric acid to the PVA solution. Furthermore, the contact angle as well as the zeta potential are significantly reduced when citric acid is added to the PVA solution. A low surface roughness and zeta potential are generally regarded to improve the anti-fouling properties of the membrane. The fact that the surface charge tends towards neutrality when citric acid is added to the PVA-solution is also regarded to improve the anti-fouling characteristics.

A further experiment was designed to compare 50% and 100% cross-linking degree. The PVA solution for 100% cross-linking degree contained 0.84% by weight of citric acid. The results are indicated table 10 below.

TABLE 10

| Citric acid | A [LMH/bar] | Rejection [%] |
|---|---|---|
| PVA + CA (50%) | 4.6 | 99.3 ± 0.2 |
| PVA + CA (100%) | 5.0 | 99.2 ± 0.2 |

Test Conditions: 2000 ppm NaCl Feed, 15.5 Bar, 1.8 LPM Flow Rate

The results indicated in table 10 show that an improved flux of about 9% may be obtained when the amount of citric acid in the PVA solution is increased from 50% cross-linking degree to 100% cross-linking degree.

The various aspects and implementations have been described in conjunction with various embodiments herein. However, other variations to the disclosed embodiments can be understood and effected by those skilled in the art in practicing the claimed subject-matter, from a study of the disclosure, and the appended claims. In the claims, the word “comprising” does not exclude other elements or steps, and the indefinite article “a” or “an” does not exclude a plurality.

The invention claimed is:

1. An anti-fouling, semi-permeable membrane comprising:
- a porous support layer;
- a thin film composite (TFC) layer formed on a surface of the support layer; and
- a cross-linked polyvinyl alcohol (PVA) layer formed on top of the TFC layer;
- wherein the cross-linked PVA layer is the reaction product of PVA and a cross-linking agent, said cross-linking agent being a polybasic acid comprising three or more acid groups or precursors thereof, characterized in that an aqueous glycerol solution is applied to a surface of the support layer not in contact with the TFC layer prior to the application of the cross-linked PVA layer.

2. The anti-fouling, semi-permeable membrane according to claim 1, wherein the TFC layer comprises aquaporin water channels.

3. The anti-fouling, semi-permeable membrane according to claim 2, wherein the aquaporin water channels are present in vesicles.

4. The anti-fouling, semi-permeable membrane according to claim 3, wherein the vesicles are polymersomes prepared by one or more polymers.

5. The anti-fouling, semi-permeable membrane according to claim 1, wherein the PVA is derived from hydrolysis of polyvinyl acetate, the degree of hydrolysis of the polyvinyl acetate being from 90% to 99.9%.

6. The anti-fouling, semi-permeable membrane according to claim 5, wherein the viscosity of the PVA measured as a 4% aqueous solution at 20° C. is between 30 mPa·s and 80 mPa·s.

7. The anti-fouling, semi-permeable membrane according to claim 1, wherein the polybasic acid is selected from the group consisting of citric acid, 1,2,3,4-butanetetracarboxylic acid, 2,3,5-hexanetricarboxylic acid, and 1,2,3-butanetricarboxylic acid.

8. The anti-fouling, semi-permeable membrane according to claim 7, wherein the polybasic acid is citric acid.

9. A method of preparing an anti-fouling, semi-permeable membrane comprising the steps of:

providing a semi-permeable membrane comprising a porous support layer having a thin film composite (TFC) layer formed on a surface thereof;

applying a layer of an aqueous PVA mixture of polyvinyl alcohol and a cross-linking agent to the TFC layer surface of the membrane; and allowing the mixture to react;

wherein the cross-linking agent is a polybasic acid having three or more acid groups or precursors thereof, characterized in that an aqueous glycerol solution is applied to the support layer of the TFC membrane prior to the application of aqueous PVA mixture.

10. The method according to claim 9, wherein the concentration of the glycerol in the aqueous glycerol solution is 13% by weight to 80% by weight.

11. The method according to claim 9, wherein the polybasic acid is selected among the group consisting of citric acid, 1,2,3,4-butanetetracarboxylic acid, 2,3,5-hexanetricarboxylic acid, and 1,2,3-butanetricarboxylic acid.

12. The method according to claim 11, wherein the polybasic acid is citric acid.

13. The method according to claim 11, wherein the concentration by weight of polybasic acid is equal to or higher than the concentration by weight of the PVA in the aqueous PVA mixture.

14. The method according to claim 13, wherein when the polybasic acid is citric acid, the concentration by weight of citric acid is at least twice the concentration of the PVA in the aqueous PVA mixture.

* * * * *